United States Patent
Bandlow et al.

(10) Patent No.: US 6,328,349 B2
(45) Date of Patent: Dec. 11, 2001

(54) SEPARABLE PIPE JOINT, IN PARTICULAR FOR AIR-CONDUCTING PIPES

(75) Inventors: Reiner Bandlow, Esslingen; Mehmet Haseki, Stuttgart; Friedrich Schulz, Benningen; Gerhard Blume, Uslar; Georg Coermann, Leinfelden-Echterdingen; Jürgen Fischer, Hannover; Jörg Rohde, Dannenberg, all of (DE)

(73) Assignee: Daimler-Chrysler AG, Stuttgart (DE)

( * ) Notice: Subject to any disclaimer, the term of this patent is extended or adjusted under 35 U.S.C. 154(b) by 0 days.

(21) Appl. No.: 09/216,458

(22) Filed: Dec. 18, 1998

(30) Foreign Application Priority Data

Dec. 20, 1997 (DE) .............................. 197 56 987

(51) Int. Cl.[7] ..................................................... F16L 39/00
(52) U.S. Cl. ........................................... 285/319; 285/921
(58) Field of Search .................................. 285/319, 921, 285/257

(56) References Cited

U.S. PATENT DOCUMENTS

| | | | |
|---|---|---|---|
| 4,711,472 | * 12/1987 | Schnell | 285/319 |
| 4,786,085 | * 11/1988 | Sauer et al. | 285/319 |
| 5,711,552 | * 1/1998 | Hogue et al. | 285/319 |
| 5,725,257 | * 3/1998 | Sakane et al. | 285/319 |
| 5,735,555 | * 4/1998 | Answine et al. | 285/921 |

FOREIGN PATENT DOCUMENTS

| | | | |
|---|---|---|---|
| 4022769 | * 1/1991 | (DE) | 285/319 |
| 6174163 | * 6/1994 | (JP) | 285/319 |

* cited by examiner

Primary Examiner—Teri Pham Luu

(57) ABSTRACT

A separable pipe joint has two pipe segments that can be inserted one into the another, a gasket-seal arranged between the pipe segments, and a collet which is arranged so as to be adjustable between a separated position and a clamped position, and which is provided with latching means for axially fixing the pipe segments. To indicate a wear-resistant separable pipe joint, which permits a variable assembly of pipe segments adjoining each other, provision is made that as latching means for fixing at least two axially spaced latching members, radially extending to the inside, are arranged on the collet, the latching members in the clamped position of the collet gripping from behind, in each case, a radially elevated clamping step on the external surface of each pipe segment.

13 Claims, 4 Drawing Sheets

SEPARABLE PIPE JOINT, IN PARTICULAR FOR AIR-CONDUCTING PIPES

FIELD OF THE INVENTION

The present invention relates to a separable pipe joint, in particular a separable pipe joint for air-conducting pipes.

BACKGROUND INFORMATION

A pipe joint is disclosed in European Patent No. 04 52 172 B1. The pipe joint, in which two adjacent pipe segments are tightly joined together, contains a collet which embraces the pipe segment ends that fit into each other. In order to prevent an unintended axial separating of the joint, lugs are formed on the collet extending radially inward, which extend into latching recesses provided on both pipe ends. The latching recesses consist of a peripheral detaining groove in the area of the first pipe end and a latching opening in the area of the second pipe end. It is necessary to line up the detaining groove and the latching opening so that the lug of the collet can extend through the latching opening into the detaining groove and so that the two pipe ends are held together in a form-locking fit.

Consequently, it is problematic that a reliable joint can only be produced when the latching opening and the detaining groove are lined up radially and axially; otherwise, no form-locking fit and consequently no reliable joint in either axial direction of the pipe segments is produced. As a result, not only the axial but also the radial assembly positions of the pipe segments are stipulated in the design and must be observed during assembly. Particularly with curved pipe segments, this joint demands a high degree of manufacturing precision and accurate positioning of the assembly parts, the radial positions being limited to one or a few specified ones in accordance with the number and distribution of the latching recesses.

A further disadvantage is that the lug must be designed with a length such that it extends through the latching openings of the radial, external pipe segment and can also engage in the detaining groove of the radial, internal pipe segment. But this makes both assembly and disassembly of the joint difficult because the collet must be widened to the point that it can be slipped over the two pipe segments without being hindered by the lug. Due to the rigidity of the collet, it is difficult to greatly widen the collet, which is necessary for the joint. In addition, there is the risk of premature wear as a result of the formation of cracks.

SUMMARY OF THE INVENTION

The present invention provides a separable pipe joint with a low rate of wear, permitting a variable assembly of adjoining pipe segments.

More specifically, the present invention provides a separable pipe joint, in particular for air-conducting pipes, having two pipe segments (2,3) that can be inserted one into the other and a gasket-seal (4) arranged between the pipe segments (2,3). A collet (5), which is arranged so that it can be adjusted between a separated position (6) and a clamped position (7), and latching means (8,9) to fix the pipe segments (2,3) axially also are provided. As the latching means (8,9), provision is made on the collet (5) for at least two latching members (8,9) extending radially to the inside and set apart axially. The latching members, in the clamped position (7) of the collet (5), in each case, grip from behind a radially elevated clamping step (10,11) on the external surface (12,13) of each pipe segment (2,3).

Since at least two latching members in two parallel planes are formed on the collet, it is possible to assign each latching member to one of the two pipe segments and thus to keep the connection between one of the two pipe segments and the collet independent of the corresponding connection to the other pipe segment. The consequence of this is that the position of the two pipe segments relative to one another is only indirectly determined by the latching device with the assistance of the collet, so that the angular position of the two pipe segments can be set substantially independent of the geometry of the pipe segments and essentially dependent only on the design shape of the collet. The variability of the pipe segments in assembly is increased.

Furthermore, it is advantageous that, in order to form a form-locking joint, the latching members on the collet only have to grip from behind one clamping step on one of the pipe segments. Therefore, it is sufficient to arrange the latching members radially to the inside only to the point that a secure form-locking fit with the respective clamping step in the axial direction is possible. The latching members do not extend far to the side, so that the collet does not need to be widened much in going from the separated position to the clamped position, and the other way around. Thus the risk of wear is reduced.

If, in accordance with one embodiment of the present invention, the latching members are formed in the area of the axial front ends of the collet, across from each other. One of the latching members can function to guard against loss of the collet in the separated position of the clamp-type latching arrangement, in that this latching member, even in the separated position of the collet, grips the clamping step of one pipe segment from behind, the clamping step extending radially over the external surface of this pipe segment. The collet can be rotated about its axis without being hindered by the clamping step, and an axial displacement is possible in the direction of the pipe end of the connecting piece facing away from the clamping step, but not a displacement beyond the clamping step.

Preferably, provision is made for a plurality of individual latching members, in particular three, in the area of each front end of the collet. These latching members can be distributed equally across the periphery, in each case in a plane that is perpendicular to the pipe axis. This embodiment has the advantage that the clamping forces are transmitted equally over the periphery of the collet and that an incorrect latching of the collet, in which the collet axis runs at an angle to the pipe axis, is avoided.

The latching members opposite the front ends are preferably arranged so as to be displaced one with respect to one from another, in order that across the periphery of the collet an approximately equal distribution of rigidity is achieved in the wall of the collet.

It is preferable that the collet can be elastically widened radially in order to make it possible to thrust the collet over the radially elevated clamping step on the second pipe segment. In this embodiment, a bayonet catch is not necessary. The elasticity in the radial direction is expediently achieved in the design by arranging the latching members on one front end on axially protruding tongues, which can be elastically bent up with little expenditure of force. In addition, provision can be made for axial slip joints in the wall of the collet.

To make it easier to convey the collet into its clamped position, the latching members can be configured so as to be ramp-shaped, as seen in the axial direction, so that during overthrust the latching members are continually bent up and, after reaching the clamped position, snap back into their initial radial position, in which the latching members in a form-locking fit grip the clamping step from behind. The latching members preferably engage in the contact grooves, which are configured on one of the pipe segments and extend radially up to the radius of the clamping step.

In order to make separating the joint easier, one side of the contact grooves is configured as an unlatching ramp, whose gradient intersects the longitudinal axis of the pipe joint. For separating, the collet is rotated so that the latching member is pushed onto the unlatching ramp and effectively reaches the radial level of the clamping step. From this position, the collet can be pulled off axially so that the pipe joint is separated.

BRIEF DESCRIPTION OF THE DRAWINGS

In the following description, the present invention is explained in more detail with the aid of drawings, in which.

DETAILED DESCRIPTION

Figure 1:
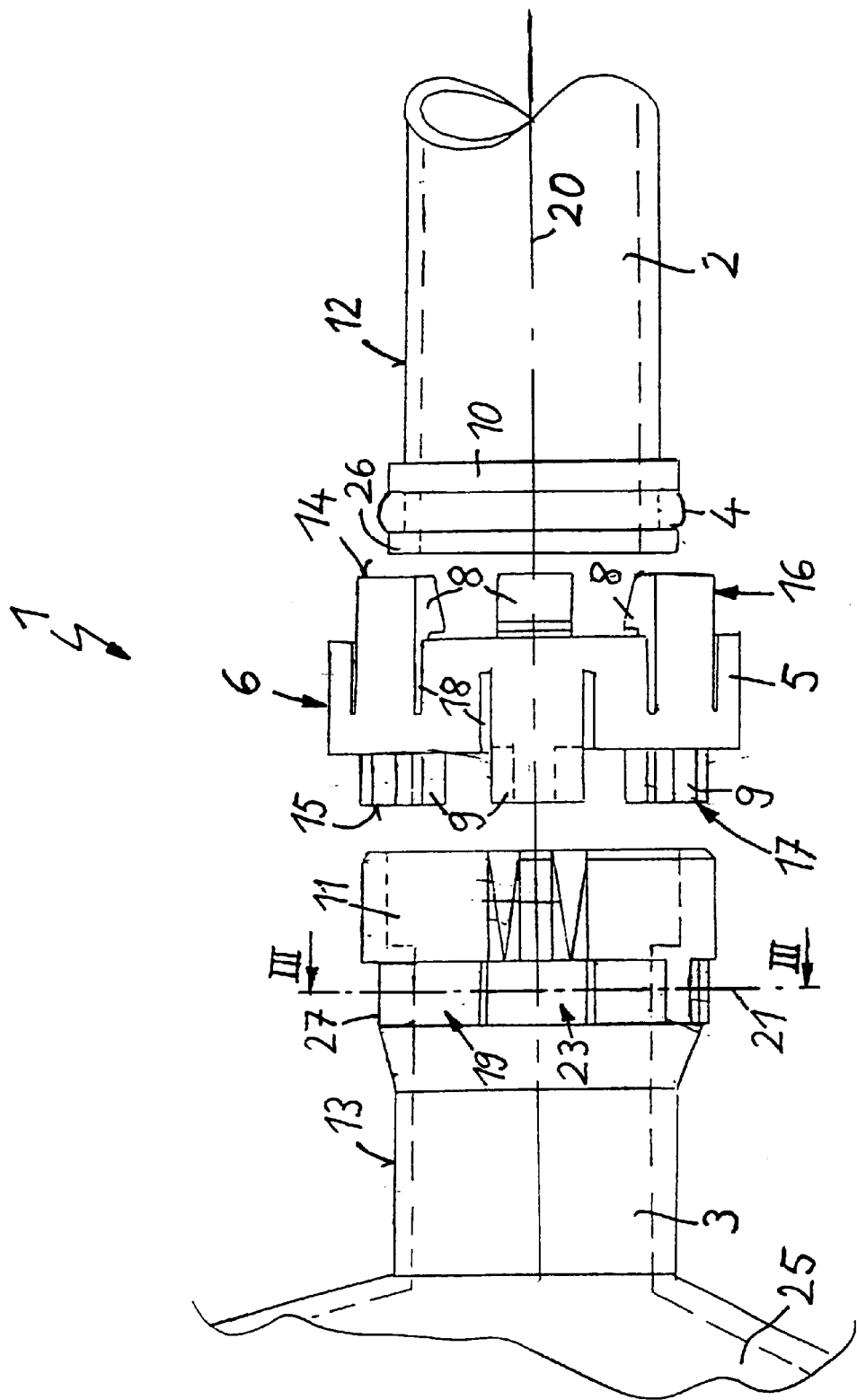
FIG. 1 shows a side view of a pipe joint of the present invention in a separated position.
Figure 2:
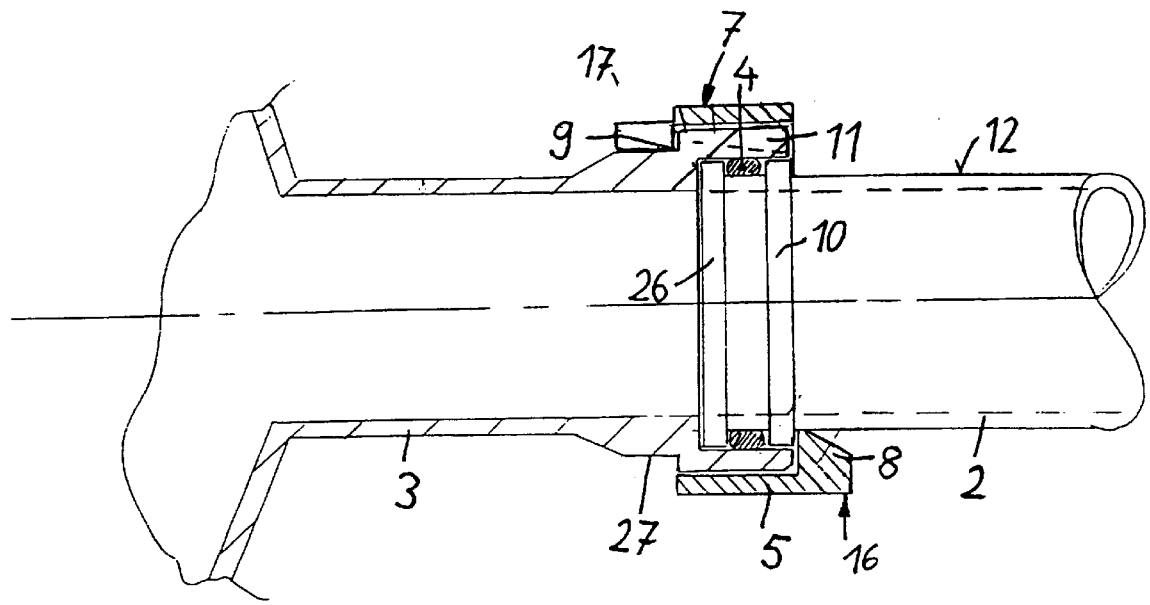
FIG. 2 shows a pipe joint of the present invention in a clamped position.

In FIGS. 1 and 2, a pipe joint 1 is shown, in which two pipe segments 2, 3, abutting each other at their front ends, are joined, air tight, with the assistance of a collet 5. The pipe segments in the exemplary embodiment are a part of an air-conducting pipe conduit system for a charge cooler 25. In FIG. 1, collet 5 is in its separated position 6; in FIG. 2, in its clamped position 7, in which pipe segments 2 and 3 are joined, air-tight. In clamped position 7, pipe segment 2 is pushed axially into pipe segment 3, whose front end is radially widened. To prevent any misdirection of air currents, a gasket-seal 4, configured as a sealing ring, is clamped-in radially between external surface 12 of pipe segment 2 and the inner surface of pipe segment 3. The sealing ring, in this context, rests on external surface 12 of pipe segment 2 and is fixed axially between a front-end, radially elevated shoulder 26 and a likewise radially elevated clamping step 10 on pipe segment 2, set apart from shoulder 26. Shoulder 26 and clamping step 10 preferably are configured integrally with pipe segment 2.

The segment where two pipe segments 2 and 3 overlap each other, is covered by radial, external collet 5. In order to create a joint that is tight, easy to assemble, and easy to disassemble, collet 5 has latching members 8 and 9 in the area of its two front ends 14, 15. The latching members 8, 9 are integrally configured with the collet and are designed to be pushed over clamping step 10 on first pipe segment 2, and over a further, radially elevated clamping step 11 on second pipe segment 3, and to lock on the lateral surface of each clamping step 10, 11, facing away axially, so that a form-locking fit is obtained in the axis direction. At each front end of collet 5, there are three latching members 8, 9, distributed equally over the periphery and at an angular distance of 120°; the latching members on the opposing front ends are offset with regard to each other, in particular at an angular distance of about 60°.

Each of latching members 8, 9 is formed on a tongue 16 or 17, the tongues 16, 17 extending axially beyond the body of collet 5. As can be seen in FIG. 1, on both sides of each tongue 16, 17, expansion slots 18 are introduced into the wall of collet 5, making possible a radial expansion of the collet in response to the over-thrust over clamping step 10 or 11 during assembly or disassembly of the pipe joint.

A thrust or pushing over clamping step 10, 11 is made easier by a ramp-shaped formation of latching members 8, 9, the narrow side of each latching member resting on the axially external side of collet 5.

Figure 3:
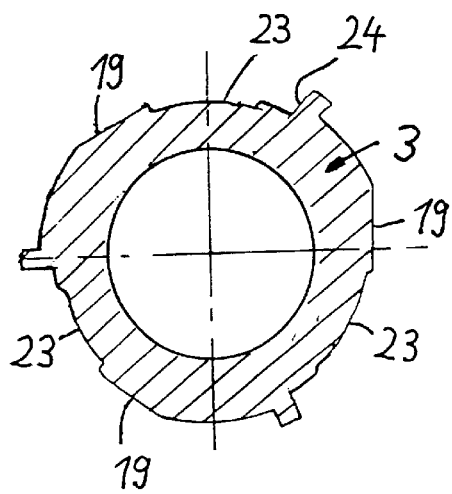
FIG. 3 shows a view along the line of intersection III—III of FIG. 1.

As can be seen in FIG. 3 in connection with FIG. 1, on pipe segment 3, which is directly connected axially to clamping step 11, a segment having axial contact grooves 23 is formed, into which extend latching members 9, which grip clamping step 11 from behind, above collet 5 is in a clamped position. The number of contact grooves 23 corresponds to the number of latching members 9. Contact grooves 23 are configured in a shoulder 27, which is part of the wall of pipe segment 3 and are axially contiguous to clamping step 11 (FIG. 2). One side of contact grooves 23 is configured as an unlatching ramp 19, which rises in the peripheral direction, so that the gradient of unlatching ramp 19 lies in a plane 21 which is perpendicular to longitudinal axis 20 of the pipe segments. Unlatching ramp 19 extends approximately from the base of contact groove 23 to the radial level of clamping step 11. To detach the joint, collet 5 can be rotated such that latching members 9 rise along unlatching ramp 19. As soon as latching members 9 rest at the level of clamping step 11, the collet can be pulled off axially without hindrance by clamping step 11.

On the other side of contact groove 23 is configured a stop 24, which prevents collet 5 from being rotated in this direction. In this way, the direction of rotation required to put the collet in the separating position is clearly established.

Figure 4:
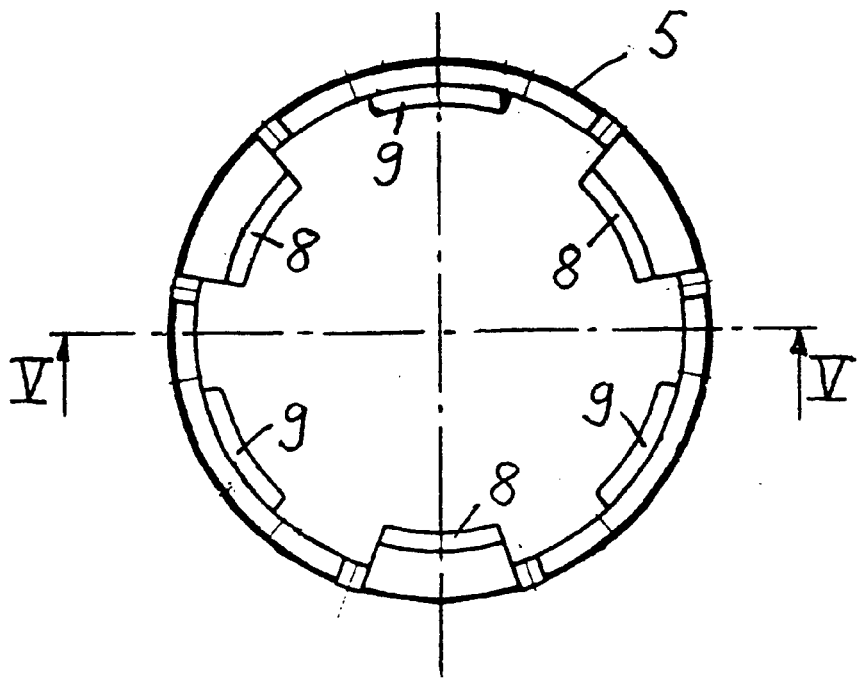
FIG. 4 shows a top view of a collet in another embodiment of the present invention.
Figure 5:
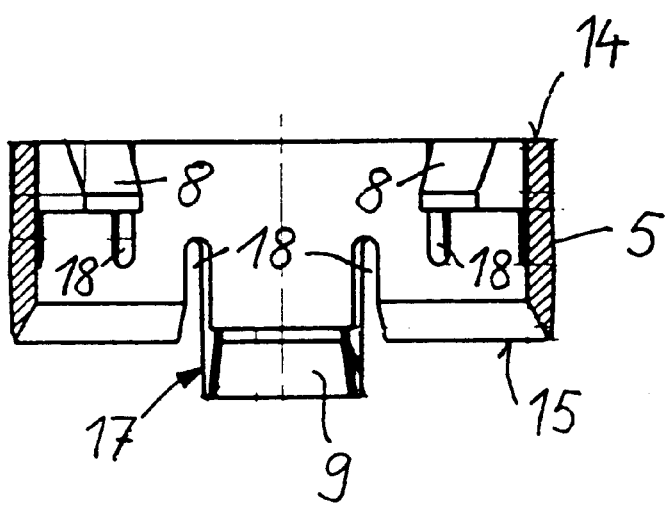
FIG. 5 shows a view of the collet along the line of intersection V—V of FIG. 4.

FIGS. 4 and 5 show a collet 5 in a modified embodiment. Latching members 8 are situated in the interior space of collet 5, without extending axially beyond the body of collet 5. Latching members 8 in the area of front end 14 extend radially further into the interior space of the collet than latching members 9 in the area of front side 15, situated opposite thereto. Collet 5 in the area of front end 14 is stiffer than at front end 15, situated opposite, on which latching members 9 extend axially on tongues 17 and can be bent out radially due to their lesser negligible stiffness. The elasticity in the area of front end 15 is also reinforced by axial expansion slots 18.

Since collet 5 on front end 14 has only negligible radial elasticity, latching members 8 are suitable for the safety-catch function, since the collet in the area of this segment can be widened only with great effort, and the collet therefore cannot simply be pulled over the clamping step being gripped by latching members 8.

Figure 6:
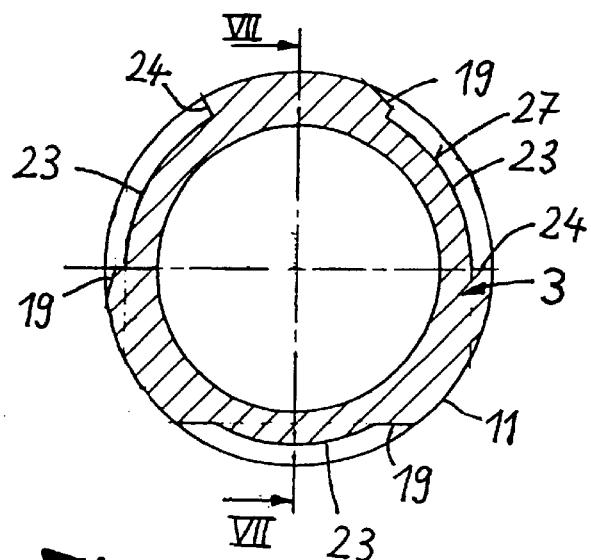
FIG. 6 shows one clamping step in sectional view of the present invention.
Figure 7:
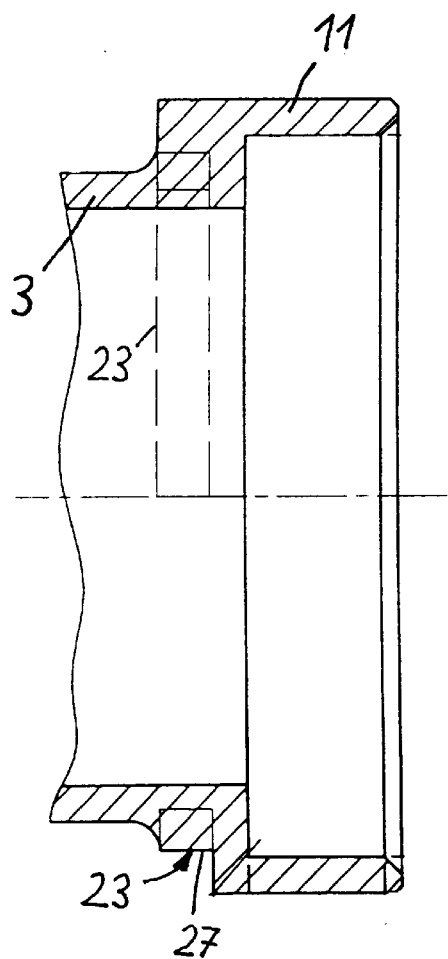
FIG. 7 shows the clamping step along the line of intersection VII—VII of FIG. 6.

FIGS. 6 and 7 show clamping step 11 on pipe segments 3 in a different embodiment. The base of three contact grooves 23 runs radially at the height of shoulder 27 of pipe segment 3, each contact groove extending radially from the level of shoulder 27 to the radius of clamping step 11. One side of contact grooves 23, is in each case configured as an unlatching ramp 19, which rises in the peripheral direction from the base of the contact groove to the radius of clamping step 11 and which, when the collet is rotated, makes possible the unlatching. The other side in two or three contact grooves is configured as stop 24, running radially.

Unlatching ramp 19 is executed as a flat surface. However, both concave and convex surfaces are also possible.

What is claimed is:

1. A separable pipe joint comprising:
    a first pipe segment having a first external surface with a radially elevated first clamping step;
    a second pipe segment insertable into the first pipe segment and having a second external surface with a radially elevated second clamping step;
    a gasket-seal arranged between the first and second pipe segments; and
    a collet having first and second front ends situated axially opposite one another, the collet being adjustable between a separated position and a clamped position, the collet having a first tongue extending axially to the first front end and a second tongue extending axially to the second front end, a first latching member formed on the first tongue in a region of the first front end and a second latching member formed on the second tongue in a region of the second front end, the first and second latching members extending radially inward, the first latching member gripping from behind the first clamping step and the second latching member gripping from behind the second clamping step in the clamped position so as to tend to hold the first and second pipe segments together.

2. The pipe joint as recited in claim 1 further comprising a third latching member configured at the first front end or the second front end.

3. The pipe joint as recited in claim 2 further comprising fourth, fifth, sixth latching members, the first, third and fourth latching members being equally arranged at a regular interval of about 120° on the first front end and the second, fifth and sixth latching members being equally arranged at a regular interval of about 120° on the second front end.

4. The pipe joint as recited in claim 3 wherein the first and second latching members are displaced about 60° to each other.

5. The pipe joint as recited in claim 1 wherein the collet is elastic and capable of being widened radially.

6. The pipe joint as recited in claim 1 wherein the first and second latching members are configured ramp-shaped in an axial direction of the collet, a narrow side of each of the first and second latching members being arranged axially externally.

7. The pipe joint as recited in claim 1 wherein the collet defines expansion slots disposed in an axial direction.

8. The pipe joint as recited in claim 1 wherein the radially elevated first clamping step is configured peripherally and continuously on the first external surface and the radially elevated second clamping step is configured peripherally and continuously on the second external surface.

9. The pipe joint as recited in claim 1 wherein at least one of the first and second pipe segments defines a contact groove in a surface thereof, and at least one of the first and second latching member engages with the contact groove.

10. The pipe joint as recited in claim 9 wherein one side of the contact groove is configured as an unlatching ramp having a gradient lying in a plane perpendicular to a longitudinal axis of the first and second pipe segments.

11. The pipe joint as recited in claim 10 wherein the unlatching ramp rises radially from a base of the contact groove to a radius of the clamping step.

12. The pipe joint as recited in claim 9 wherein one side of the contact groove is configured as a stop.

13. A separable pipe joint for air-conducting pipes comprising:
    a first air pipe segment having a first external surface with a radially elevated first clamping step;
    a second air pipe segment insertable into the first pipe segment and having a second external surface with a radially elevated second clamping step;
    a gasket-seal arranged between the first and second pipe segments; and
    a collet having first and second front ends situated axially opposite one another, the collet being adjustable between a separated position and a clamped position, the collet having a first tongue extending axially to the first front end and a second tongue extending axially to the second front end, a first latching member formed on the first tongue in a region of the first front end and a second latching member formed on the second tongue in a region of the second front end, the first and second latching members extending radially inward, the first latching member gripping from behind the first clamping step and the second latching member gripping from behind the second clamping step in the clamped position so as to tend to hold the first and second pipe segments together.

\* \* \* \* \*